United States Patent [19]

Dischö

[11] Patent Number: 5,387,644
[45] Date of Patent: Feb. 7, 1995

[54] MONOMER PREPARATIONS FOR THE CONSTRUCTION INDUSTRY

[75] Inventor: Karoly Dischö, Effretikon, Switzerland

[73] Assignee: Sandoz Ltd., Basel, Switzerland

[21] Appl. No.: 167,256

[22] Filed: Dec. 14, 1993

[30] Foreign Application Priority Data

Dec. 15, 1992 [DE] Germany ............... 4242356

[51] Int. Cl.$^6$ ............ C08K 3/04; C08K 5/01; C08L 75/06; C08L 75/08
[52] U.S. Cl. ............ 524/847; 524/474; 524/495; 524/496; 524/848; 524/871; 524/872; 524/873; 524/513; 526/283; 526/284; 526/301; 526/320
[58] Field of Search ............ 524/474, 490, 491, 495, 524/496, 847, 848, 871, 872, 873, 513, 283; 526/284, 301, 320

[56] References Cited

U.S. PATENT DOCUMENTS

| | | | |
|---|---|---|---|
| 3,832,315 | 8/1974 | Bueche | 524/848 |
| 4,097,677 | 6/1978 | Emmons et al. | 560/220 |
| 4,341,673 | 7/1982 | Hyde | 524/272 |
| 4,421,678 | 12/1983 | Mehta | 524/496 |

FOREIGN PATENT DOCUMENTS

| | | |
|---|---|---|
| 0047120 | 8/1981 | European Pat. Off. . |
| 0157596 | 3/1985 | European Pat. Off. . |
| 3822202 | 1/1990 | Germany . |
| 3822203 | 2/1990 | Germany . |
| 3920795 | 2/1990 | Germany . |
| 4218414 | 12/1992 | Germany . |

*Primary Examiner*—Peter Szekely
*Attorney, Agent, or Firm*—Robert S. Honor; Richard E. Vila; Carol A. Loeschorn

[57] ABSTRACT

A hardenable monomer composition useful for flooring composition, grouts, mortars and the like comprises a mixture of crosslinkable acrylic monomer, carbon black and/or polyester- or polyether-methane oligomer having at least two polymerizable double bonds and a paraffin oil.

The monomer is preferably of the formula I $$CH_2=C-C-(OR_1)_n-OR_2$$
$$\phantom{CH_2=}|\phantom{C}\|$$
$$\phantom{CH_2=C}R\phantom{-}O$$

and there is preferably present other monomers, particularly hydroxypropyl methacrylate.

10 Claims, No Drawings

MONOMER PREPARATIONS FOR THE CONSTRUCTION INDUSTRY

The invention relates to monomer preparations suitable for use in the construction industry, and to compositions utilizing such preparations.

Compositions sometimes referred to as "polymer concrete" mixtures of cross-linkable acrylic monomers and fillers, especially sand, are well known in the construction industry. These are useful as floorings and coatings for concrete objects and are notable for their high mechanical strength. Similar compositions without fillers may be used as coatings and impregnants.

It has now been found that the properties of such compositions can be considerably improved if the monomer preparations employ, in addition to certain polyfunctional oligomers and/or carbon black, a paraffin oil.

The invention therefore provides a hardenable monomer composition, comprising at least one cross-linkable acrylic monomer with a flash point above 50° C., 0.01 to 7% by weight of the monomer of carbon black and/or at least one polyfunctional polyester- or polyetherurethane/acrylate oligomer, and from 0.01–1% by weight of the total composition of at least one paraffin oil.

The quantity of carbon black to be added are based on the quantity of acrylic monomer and is preferably 0.1 to 3, most preferably 0.1 to 0.5% by weight. The preferred carbon black has a BET surface area of 20–460 m$^2$/g. Various types of carbon black may be used, e.g. gas black, lamp black and furnace black.

The oligomers useful in the compositions of this invention are aliphatic or aromatic, bifunctional or polyfunctional polyester- or polyether-urethane acrylates with a molecular weight of 500–2000, preferably 1000–2000, and a viscosity at 25° C. of 2,000–100,000, preferably 12,000 to 100,000, most preferably 60,000 to 75,000 mPa s. They may be produced by the polymerization of acrylic acid radicals or methacrylic acid radicals with polyester- or polyether-urethanes, and they have at least two unsaturated double bonds which serve as crosslinking sites. It is preferable to use oligmers rather then carbon black.

A suitable commercially-available oligomer is GENOMER (trade mark) T 1200 (aliphatic/triacrylate) sold by the company Rahn, Zürich, with a molecular weight of 1000–1200 and a viscosity of 70,000 mPa s. Other useful commercial products are:

| Name | Company | Structure | MW | viscosity |
|---|---|---|---|---|
| GENOMER T 1600 | Rahn AG Zürich | aliphatic triacrylate | ~1600 | 52,000 |
| GENOMER D 1500 B | Rahn AG Zürich | aliphatic diacrylate | | |
| EBECRYL 205 | UCB Belgium | aromatic triacrylate | 2000 | 30,000 |
| EBECRYL 210 | UCB Belgium | aromatic diacrylate | 1500 | 4,000 |
| EBECRYL 1259 | UCB Belgium | aliphatic triacrylate | 2000 | 14,000 |
| EBECRYL 1290 | UCB Belgium | aliphatic hexacrylate | 1000 | 2,000 |

The acrylic monomer employed may be selected from known acrylic monomers which may be hardened by means of catalysts to form a solid polymeric mass. Preferred examples of acrylic monomers are certain esters of acrylic acid (or preferably methacrylic acid), which have been described, for example, in EP 047120, U.S. Pat. Nos. 4,460,625, 4,097,677, 4,299,761, 4,400,413 and GB 2,220,204 the contents whereof are incoporated herein by reference. One preferred group of such monomers corresponds to the general formula I

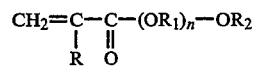

wherein
R signifies hydrogen or methyl,
R$_1$ signifies an alkylene group with 2 to 6 C-atoms,
n signifies an integer from 1 to 3 or nil, and
R$_2$ signifies a radical of an aromatic or alicyclic dicarboxylic acid ester, or if n=0, a dicyclopentenyl radical.

Such acrylic monomers have a flash point of at least 50° C. and preferably above 100° C.

Preference is given to those esters in which R signifies methyl, R$_1$ signifies a branched alkylene group with 3 or 4 C-atoms, n signifies the number 1 and R$_2$ signifies the radical of a tetrahydrophthalic acid, which in addition is esterified with a simple alcohol such as methanol or ethanol.

These acrylic esters according to formula I can be used alone or mixed with other (meth)acrylic esters in order to confer particular desirable properties in the final product. Preferred examples of such esters are hydroxyalkyl(meth)acrylates, particularly hydroxypropyl methacrylate. Based on the amount of monomers in the whole mixture, the acrylates of formula I ("component I") make up 20 to 100 percent by weight, preferably 50–95 percent by weight, and the other (meth)acrylates ("component II") make up 8 to 80 percent by weight, preferably 5–50 percent by weight, if there is no oligomer. When, as is preferred, carbon black is absent and oligomer is present, the proportions are: component I 20 to 93, preferably 50 to 80 percent by weight, component II 0 to 73, preferably 7–37 percent by weight, and the oligomer 7 to 60 percent by weight, preferably 13–40 percent by weight.

By "paraffin oil" is meant an oil derived from paraffin distillate or a liquid petrolatum (see, for example, "Hawley's Condensed Chemical Dictionary", ed. Sax and Lewis (11th Ed., Van Nostrand Reinhold 1987) and "The Merck Index" 11th Ed. (Merck 1989), the contents whereof are incorporated herein by reference). Such oils are well known and widely used in medicine and commerce. The paraffin oils for use in this invention may be any such oils, provided that the density of the oil is lower than that of the remainder of the composition. As a result, preference is given to the low density (so-called "light") oils, but a blend of low and high density oils or even a high density (so-called "heavy") oil may also be useful.

By adding paraffin oil in quantities of 0.01 to 1%, preferably from 0.1–0.5% by weight (based on the weight of the composition), reactivity is enhanced, that is, the hardening of the preparations is more rapid, which in turn means a shorter pot life. Moreover, a higher compressive strength after one hour is achieved.

The catalysts which may be used for crosslinking or hardening of the compositions according to the invention include monomer-soluble organic peroxides or hydroperoxides of hydrocarbons with 3–18 carbon atoms, salts or complexes of transition metals and/or aromatic amines as polymerization accelerators. The peroxides or hydroperoxides are present in quantities of 0.1 to 5 percent by weight, the salts or complexes of transition metals in quantities of 0.0005 to 2 percent by weight and the aromatic amines in quantities of 0.1 to 5 percent by weight of the total weight of acrylic monomer. Examples of suitable peroxides are benzoyl peroxide, tert. butyl perbenzoate, dilauryl peroxide and 2,2-bis-(tert.butylperoxy)-butane. Suitable hydroperoxides are tert.-butyl hydroperoxide, cumene hydroperoxide and diisopropylbenzene hydroperoxide.

The salts or complexes of transition metals are those which catalyse the oxidative hardening of drying oils and are known as siccatives. They are normally calcium, copper, zinc, magnesium, manganese, lead, cobalt, iron, vanadium or zirconium salts of higher aliphatic (8–30 C) carboxylic acids and naphthenic acids. Cobalt and manganese salts are preferred, such as cobalt octoate, cobalt naphthenate, cobalt acetylacetonate and the corresponding manganese salts.

The aromatic amines which may optionally be used as polymerization accelerators are known for this purpose. Examples are aniline, N,N-dimethyl- or N,N-diethylaniline, corresponding toluidines and p-dimethylaminobenzaldehyde, which are preferably used in quantities of 0.1 to 6 percent by weight, preferably 0.1 to 2 percent by weight, based on the weight of the monomer components. Especially good results are obtained with phenyl-diethanolamine.

Such a catalyst system preferably consists of a peroxide or hydrogen peroxide, an aromatic amine and a transition metal salt.

The compositions according to the invention may contain an essentially dry aggregate, which comprises 40–95% by weight of the total composition. Any inorganic compound which is inert towards acids, bases and salts may be considered as the aggregate. For example, sand, gravel or coarser aggregate materials such as solid or hollow substances, or combinations thereof, which are normally used in polymer concrete, may be employed. For coatings, fine aggregates such as fine sand, possibly mixed with silica fume, are employed. These various constituents may be added shortly before application of the composition or they may be contained in various packages, which are stable in storage, with the monomers and/or aggregate. Thus, for example the aggregate, the various monomers with the optional polymerization accelerators and the polymerization catalyst with the transition metal salt are delivered in separate packages, which are mixed together shortly before use. Depending on the catalyst employed, the catalyst system (without accelerator) may also be premixed with the aggregate, or the monomer mixture may be pre-mixed with the aggregate.

By using synthetic fibres as fillers, floor coatings with high impact resistance are obtained.

Such compositions may also be employed as mortar for repairs.

These compositions may be used to repair concrete objects or surfaces. In this work, a preparation according to the invention is applied to the surface requiring repair and is allowed to harden at the outside temperature. However, they may also be used for the impregnation or coating of porous materials, especially concrete, or for filling cracks. These preparations are used in particular to produce very resistant flooring.

Apart from good water resistance and heat resistance, the hardened compositions obtained are especially notable for their increased impact resistance, their compression strength and flexural strength, as well as outstanding adhesive strength. The monomer compositions have improved reactivity.

In the following examples, the parts and percentages are by weight. The temperatures are given in degrees celsius.

In Examples 1–7, Component I is an ester of tetrahydrophthalic acid monomethyl ester and hydroxypropyl methacrylate, Component II is a hydroxypropyl methacrylate, the oligomer is the product GENOMER T 1200 ex Rahm, Zürich, the carbon black used is a furnace black with a BET surface area of 80 m$^2$/g (Printex 300 ex Degussa), and the paraffin oil is PIONIER (trade mark) 2076P Paraffinum Perliquidum DAB 9 ex Klaus Dahlake AG Hamburg.

The pot life and tack-free time of the polymeric concrete mass obtained are determined at room temperature. The impact resistance is expressed in m Joule/cm$^2$, and compression strength and flexural strength in Newton/mm$^2$. The tests are carried out according to standard methods.

| Preparation | Ex. 1 | Ex. 2 | Ex. 3 | Ex. 4 |
|---|---|---|---|---|
| comp. I | 7.3 | 7.3 | 7.3 | 7.3 |
| comp. II | 3.7 | 3.7 | 3.7 | 3.7 |
| oligomer | 4.0 | 4.0 | 4.0 | 4.0 |
| carbon black | 0.02 | 0.02 | — | — |
| paraffin oil | 1.0 | — | 0.1 | — |
| cobalt naphthenate | 0.15 | 0.15 | 0.15 | 0.15 |
| benzoyl peroxide | 0.8 | 0.8 | 0.8 | 0.8 |
| TiO$_2$ | 1.0 | 1.0 | 1.0 | 1.0 |
| phenyl diethanolamine | — | — | 0.02 | 0.02 |
| sand | 69.03 | 70.03 | 69.93 | 70.03 |
| barium meal | 13.0 | 13.0 | 13.0 | 13.0 |
| pot life/22° C. in min. | 20–25 | 30–35 | 20 | 30 |
| tack-free time/22° C. in hours | ca. 16 | ca. 24 | ca. 12 | >24 |

| Preparation | Ex. 5 | Ex. 6 | Ex. 7 |
|---|---|---|---|
| comp. I | 7.3 | 7.3 | 7.3 |
| comp. II | 3.7 | 3.7 | 3.7 |
| oligomer | 4.0 | 4.0 | 4.0 |
| p-Dimethylamino-benzaldehyde | 0.4 | 0.4 | 0.4 |
| paraffin oil | 1.0 | — | 0.01 |
| cobalt naphthenate | 0.15 | 0.15 | 0.15 |
| benzoyl peroxide | 0.8 | 0.8 | 0.8 |
| TiO$_2$ | 1.0 | 1.0 | 1.0 |
| glass pearls | 1.0 | 1.0 | 1.0 |
| quartz sand 0.04–0.1 mm | 4.0 | 4.0 | 4.0 |
| quartz sand 0.1–0.3 mm | 63.15 | 64.15 | 64.14 |
| barium meal | 13 | 13 | 13 |
| polyethylene fibres | 0.5 | 0.5 | 0.5 |
| pot life/22° C. in min. | 15–20 | 40–45 | 40–45 |
| tack-free time/22° C. in hours | ca. 1.5 | ca. 3 | ca. 2 |
| compressive strength RT after 1 hour | 47 | 33 | |
| flexural strength RT after 1 hour | 20 | 14 | |

EXAMPLE 8

A three component mortar according to the invention is made up of the following materials.

| | | |
|---|---|---|
| 1. | monomer[1] | 4.218 |
| 2. | hydroxypropyl methacrylate | 2.822 |
| 3. | oligomer[2] | 2.014 |
| 4. | p-dimethylaminobenzaldehyde | 0.256 |
| 5. | acrylic functional silane[3] | 0.190 |
| 6. | cobalt naphthenate | 0.168 |
| 7. | paraffin oil[4] | 0.148 |
| 8. | iron oxide (red pigment grade) | 0.090 |
| 9. | rheology modifier[5] | 0.014 |
| 10. | barium meal | 18.954 |
| 11. | quartz sand 0.1–1.6 mm | 63.818 |
| 12. | titanium dioxide | 1.718 |
| 13. | glass beads | 4.830 |

| | | |
|---|---|---|
| -continued | | |
| 14. benzoyl peroxide | | 0.760 |

[1] tetrahydrophthalic acid monomethyl ester/HPMA ester
[2] "Genomer" T1200
[3] "Dynasilan" (trade mark) MEMO (ex Hüls)
[4] "Pionier" P2071 (ex Dahlake, Hamburg)
[5] "Aerosil" (trade mark) (ex Degussa)

Materials 1–3 and 5 are loaded into a mixer and mixed well. Material 4 is added and mixing is continued until a solution is obtained. This mixture constitutes Component A of the mortar. Component B is prepared by mxiing Material 6 and 7 in a kneader, followed by Materials 8–10.

Component C is prepared by loading Material 11 into a mixer and gradually adding Material 14 while slowly stirring. The Material 12 and 13 are then added.

When mixed well together, the three components form a repair mortar which is equal in performance to commercially-available, high-performance repair mortars.

I claim:

1. A hardenable monomer composition, comprising
   (a) at least one cross-linkable acrylic monomer with a flash point above 50° C.;
   (b) at least one material selected from the group consisting of (i) 0.01 to 7% by weight of carbon black, said weight based on the weight of the monomer, and (ii) at least one polyfunctional polyester- or polyether-urethane/acrylate oligomer; and
   (c) from 0.01–1% by weight, based on the weight of the total composition, of at least one paraffin oil, said paraffin oil having a density which is lower than the density of the remainder of the composition.

2. A hardenable monomer composition according to claim 1, wherein carbon black is present in an amount of 0.1 to 3%, by weight, based on the weight of acrylic monomer, said carbon black having a BET surface area of 20–460 m²/g.

3. A hardenable monomer composition according to claim 1, wherein (b) is selected from one or more polyfunctional polyester- or polyether-urethane/acrylate oligomers.

4. A hardenable monomer composition according to claim 1, wherein the oligomer has at least two unsaturated double bonds, and a viscosity at 25° C. of from 2,000 to 100,000 mPa s.

5. A hardenable monomer composition according to claim 1, wherein the monomer is a monomer corresponding to the general formula I

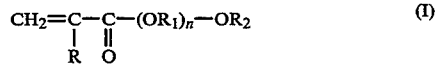

wherein
R signifies hydrogen or methyl,
$R_1$ signifies an alkylene group with 2 to 6 C-atoms,
n signifies an integer from 1 to 3 or n=0, and
$R_2$ signifies a radical of an aromatic or alicyclic dicarboxylic acid ester, or if n=0, a dicyclopentenyl radical.

6. A hardenable monomer composition according to claim 5, wherein R signifies methyl, $R_1$ signifies a branched alkylene group with 3 or 4 C-atoms, n signifies the number 1 and $R_2$ signifies the radical of a tetrahydrophthalic acid, which is esterified with a simple alcohol.

7. A hardenable monomer composition according to claim 5, wherein the monomer of formula I is mixed with at least one ester of (meth)acrylic acid.

8. A hardenable monomer composition according to claim 7, wherein the ester is a hydroxyalkyl(meth)acrylate.

9. A hardenable monomer composition according to claim 1 which additionally includes aggregate in an amount of 40–95% by weight based on the total weight of said composition.

10. A hardenable monomer composition according to claim 5 which comprises 20–93% by weight of the monomer of formula I, 7–60% by weight of the oligomer and optionally, up to 73% by weight of at least one ester of (meth)acrylic acid, said ester being mixed with the monomer, said weights being based on the combined weight of said monomer, oligomer and ester and 0.01–1% by weight based on the weight of the total composition at least one paraffin oil.

* * * * *